United States Patent [19]

Wreede et al.

[11] 4,329,409

[45] May 11, 1982

[54] PROCESS FOR FABRICATING STABLE HOLOGRAMS

[75] Inventors: John E. Wreede, Monrovia; Andrejs Graube, Marina Del Rey, both of Calif.

[73] Assignee: Hughes Aircraft Company, Culver City, Calif.

[21] Appl. No.: 175,109

[22] Filed: Aug. 4, 1980

[51] Int. Cl.$^3$ .......................... G03C 5/24; G03C 5/26
[52] U.S. Cl. ...................................... 430/1; 350/3.6; 350/3.61; 430/2; 430/14; 430/17; 430/18; 430/523; 430/533; 430/961
[58] Field of Search ............... 430/1, 2, 523, 524, 430/525, 954, 961, 533, 538, 539, 363, 12, 13, 14, 17, 18, 432, 463; 350/67, 3.6, 3.61

[56] References Cited

U.S. PATENT DOCUMENTS

| | | | |
|---|---|---|---|
| 3,397,980 | 8/1968 | Stone | 430/1 |
| 3,637,416 | 1/1972 | Misch et al. | |
| 3,642,472 | 2/1972 | Mayo | 430/1 |
| 3,645,779 | 2/1972 | Kienel | |
| 3,668,795 | 6/1972 | Barker | 430/2 |
| 3,811,753 | 5/1974 | Onoki et al. | |
| 3,864,132 | 2/1975 | Rasch et al. | 430/524 |
| 3,928,108 | 12/1975 | Adicoff et al. | |
| 3,984,581 | 10/1976 | Dobler et al. | |
| 4,014,602 | 3/1977 | Ruell | 430/1 |
| 4,025,345 | 5/1977 | Kido | 430/461 |
| 4,032,338 | 6/1977 | Gange | |
| 4,076,772 | 2/1978 | Murbach | 427/163 |

FOREIGN PATENT DOCUMENTS

1297115  11/1972  United Kingdom ................ 430/950

OTHER PUBLICATIONS

"Photographic Emulsion Chemistry", G. F. Duffin, The Focal Press, London (1966), pp. 51-54.
Holographic Optical Element for Visual Display Applications, D. E. McCauley, C. E. Simpson, W. J. Murbach, pp. 232-242.

*Primary Examiner*—Mary F. Downey
*Attorney, Agent, or Firm*—David W. Collins; W. H. MacAllister

[57] ABSTRACT

An improved method for fabricating a light weight dichromated gelatin hologram package on plastic or glass substrates is provided. The prior art cover plate protecting the gelatin layer is eliminated by depositing on the gelatin a material providing a barrier to atmospheric moisture and possessing abrasion-resistant properties. In one embodiment, the photosensitive gelatin layer is deposited on a plastic substrate employing at least one subbing layer which provides a barrier to atmospheric moisture. Protection of the gelatin layer is provided by a plasma deposited silicon nitride film thereon.

16 Claims, 2 Drawing Figures

PROCESS FOR FABRICATING STABLE HOLOGRAMS

CROSS-REFERENCE TO RELATED APPLICATIONS

This application is related to Ser. No. 137,343, filed Apr. 4, 1980, which discloses fabrication of holograms comprising photosensitive layers on plastic substrates, employing as a subbing layer between the substrate and photosensitive layer a glassy, moisture barrier layer.

This application is also related to Ser. No. 174,950, filed Aug. 4, 1980, which discloses employing a double subbing layer comprising a polycrystalline, moisture barrier layer and a hydrophilic, polar layer between the substrate and the photosensitive layer.

BACKGROUND OF THE INVENTION

1. Field of the Invention

The invention relates to a process for fabricating a light-weight gelatin-based hologram layer on substrates, and, in particular, to a process for increasing the abrasive and atmospheric moisture resistance of the gelatin without the need for a cover plate.

2. Description of the Prior Art

It has been widely recognized in the photographic art that a light-sensitive photographic emulsion, or photosensitive material, applied directly to the surface of a plastic support or substrate does not exhibit sufficient adhesion to the support film for use in most of the usual photographic end uses. As a result, it has become common practice to interpose one or more "subbing" layers between the support film and the photographic emulsion or photosensitive material. These problems also obtain for holographic applications, since photosensitive materials applied to plastic substrates are also employed.

There are many problems attending the use of chemical subbing layers on photographic and holographic plastic substrates. In addition to the obvious drawbacks of having to deposit one or more subbing layers, these subbing layers:

(1) are specific to plastics of different chemical composition;

(2) do not prevent the diffusion of water vapor into the photosensitive layer and therefore do not improve hologram stability; and (3) can be grainy and non-uniform in thickness, which graininess causes light scattering noise during exposure and which non-uniformity causes phase errors in transmitted light.

Chemical subbing techniques for photographic plastic substrates are the subject of a review in a book by G. F. Duffin, *Photographic Emulsion Chemistry*, Focal Press Limited, London, 1966. A technique for chemically subbing poly-(methyl methacrylate) for use as a dichromated gelatin holographic substrate is the subject of an article by D. G. McCauley et al., in Vol. 12, Applied Optics, pp. 232–242 (1973).

While the subbing layers of the prior art are generally suitable for regular photographic substrates, the graininess and non-uniformity limits their usefulness for fabricating holographic substrates.

An additional problem involving holographic substrates has been the need for a cover plate to protect the photosensitive layer. In certain requirements, such as helmet-mounted displays, the weight of the cover plate, even though of light-weight plastic, is still sufficient to cause strain on the wearer. Further, the thickness of the cover plate is often sufficient to create ghost images.

Subbing layers are not required when using glass plates as substrates, as is well-known, because the photosensitive layer usually adheres well to the glass. Indeed, it is largely due to the requirements of minimal weight that plastic substrates are employed. Nevertheless, there are instances where the use of glass substrates is dictated, yet, again because of weight or ghost images, glass cover plates are not desirable.

SUMMARY OF THE INVENTION

In accordance with the invention, a protective cover layer is formed directly on the exposed surface of a gelatinous photosensitive layer upon which has been recorded a hologram. The protective layer includes at least a moisture barrier layer and a hard, abrasion-resistant layer. These layers may, in certain cases, be one and the same. Additionally, a smoothing layer may be formed on the photosensitive layer prior to formation thereon of the moisture barrier layer.

The hologram, which is supported on a substrate, is fabricated by a process which comprises:

(a) forming a layer of a hydrophilic, photosensitive material on at least a portion of the substrate;

(b) exposing the photosensitive layer to an actinic interference pattern to record a latent image thereon;

(c) developing the photosensitive layer to obtain the record latent image; and (d) forming a protective layer on at least a portion of the photosensitive layer.

The process of the invention provides for protection of holograms while eliminating cover plates. The substrate employed may be plastic or glass. The holograms fabricated in accordance with the invention evidence the lifetime characteristics and abrasion resistance of holograms on glass substrates with glass cover plates. As a result, significant improvements in weight and expense are obtained, since the need for a comparatively heavy cover plate, whether glass or plastic, is eliminated. Further, ghost images are substantially reduced.

DETAILED DESCRIPTION OF THE INVENTION

Holograms are finding a variety of uses, including helmet-mounted displays such as disclosed in U.S. Pat. No. 3,928,108 and eye protection reflectors for laser radiation, where light weight materials, resistance to abrasion are resistance to wavelength change from swelling due to water absorption, are of primary importance. In fabricating a hologram, a pre-holographic element comprising a photosensitive layer on a substrate is processed to expose the photosensitive layer to an actinic interference pattern to record a latent image thereon. The photosensitive layer is then developed to obtain the recorded latent image and the photosensitive layer is covered with a protective layer. By actinic radiation is meant that radiation which has an effect on the photosensitive layer.

The pre-holographic element is fabricated by a process which includes forming a layer of a hydrophilic, photosensitive material on at least a portion of a substrate. The substrate may be glass, in which case the photosensitive material is formed directly on the surface. Alternatively, the substrate may be a plastic. Since plastic substrates are hydrophobic, prior to forming the photosensitive layer, a layer of an optically transparent, polar, moisture barrier material is formed on at least a portion of the hydrophobic substrate, preferably by a process which generates a temperature at the substrate less than that of its softening point at which it deforms.

As used herein, hydrophilic photosensitive layers include photographic and holographic emulsions which utilize hydrophilic organic colloids as an emulsion vehicle. Hydrophobic plastic substrates include materials such as cellulose-acetate, polystyrene, polyester, poly(methyl methacrylate) and polycarbonate.

The moisture barrier may be the substrate itself, as in the case of a glass substrate. No subbing layer is required, since glass surfaces are generally sufficiently hydrophilic to accept gelatin layers with good adhesion.

Figure 1:
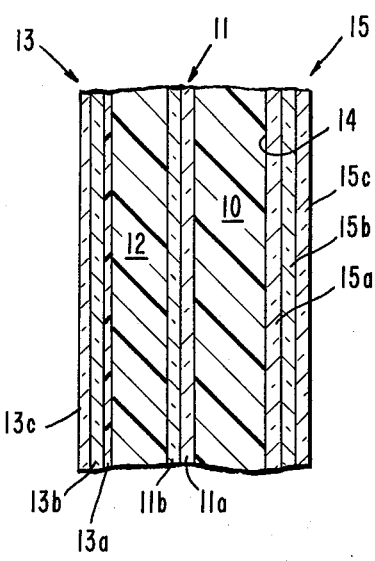
FIG. 1, in cross-section, depicts a hologram with a protective layer in accordance with the invention.

On the other hand, for a plastic substrate, a subbing layer which provides both moisture barrier properties and good adhesion to both substrate and gelatin is required. As shown in FIG. 1 (not to scale), hydrophobic substrate 10 supports moisture barrier layer 11 which in turn supports photosensitive material 12. The coated substrate may be of any shape, such as planar, as shown in FIG. 1, spherical, cylindrical, aspherical and combinations thereof.

The hydrophobic substrate may comprise any of the optically transparent plastic materials suitable in the art and include materials such as cellulose-acetate, polystyrene, polyester, poly-(methyl methacrylate) and polycarbonate and copolymers containing these polymers.

The thickness of the substrate is not critical, other than that it be thick enough to provide adequate support, that is, be mechanically rigid or stable to support the photosensitive layer, and thin enough to be substantially optically transmissive, as described below. Typical thicknesses range from about 1/16 to ¼ inch.

By optically transparent, as used herein, is meant that the material is substantially transparent at least over the visible and near-infrared regions. For all optically transparent layers combined, the radiation transmitted to the photosensitive layer should be at least about 95% of the radiation incident on the surface of the outermost layer, neglecting surface reflections.

The moisture barrier layer between the hydrophobic substrate and hydrophilic photosensitive layer comprises a glassy and/or polycrystalline, optically transparent, polar material. By glassy is meant an inorganic substance that has cooled to a rigid condition without crystallizing. Since the polar character of the photosensitive layer varies from one material to another, the polarity of the moisture barrier material immediately adjacent the photosensitive layer should be adequate so as to provide sufficient adhesion of the photosensitive layer thereto. In any event, simple experimentation is sufficient in selecting suitable materials.

The moisture barrier layer provides a barrier against diffusion of water vapor such that over the lifetime of the device (typically about 3 to 5 years), no more than about $2 \times 10^{-6}$ g $H_2O/cm^2$ is transmitted. Examples of such materials include glasses having a high coefficient of expansion of about $10^{-5}/°C.$, borosilicate glasses, borate glasses, silica ($SiO_2$), silicon oxynitride and silicon nitride ($Si_3N_4$).

It may be desirable to provide multiple layers comprising moisture barrier materials and polar materials, which may be employed in various combinations. For example, possible materials for a layer not immediately adjacent the photosensitive layer include silicon nitride, magnesium fluoride or other polycrystalline or glassy materials, which are good moisture barriers, but do not necessarily provide good adherence to the photosensitive layer.

The thickness of the moisture barrier layer is not per se critical, other than that it be thick enough to provide the moisture barrier protection noted above and not so thick as to result in cracking due to thermal stresses resulting from different thermal coefficient of expansion of materials. For a moisture barrier layer of $SiO_2$, suitable thicknesses range from about 0.2 to 5 $\mu$m. A layer 11a of $Si_3N_4$ of about 0.1 to 1 $\mu$m in thickness is suitable for use as a moisture barrier layer in conjuction with a layer 11b of $SiO_2$ of about 0.1 to 0.5 $\mu$m in thickness as a hydrophilic layer to which the photosensitive layer is attached. Alternately, a mixed layer of about 0.2 to 1 $\mu$m of silicon oxynitride (co-deposited $SiO_2$ and $Si_3N_4$) will provide a sufficient moisture barrier with suitable hydrophilic character for adherence of the photosensitive layer. Other combinations of layers may also be employed.

Thicknesses in the aforementioned ranges provide adequate moisture barrier protection consistent with minimal effects resulting from thermal stresses. The efficiency of the moisture barrier not only depends on thickness, but also on porosity. Moisture barriers with pinholes or cracks clearly would not be suitable. Also, layers deposited on rough surfaces may require additional thickness to provide adequate protection.

The moisture barrier material is formed on the hydrophobic substrate by a process which generates a temperature at the substrate less than that of its softening point at which it deforms. Examples of such processes include electron beam evaporation and plasma-enhanced deposition. These well-known processes can be performed without pre-heating the substrate, and result in surface temperatures under 100° C. Clearly, processes resulting in melting of the substrate would be unsuitable. However, processes which may result in temperatures sufficient to heat the substrate to its softening point, including the e-beam evaporation and plasma-enhanced deposition processes mentioned above, may be used so long as the plastic substrate is not deformed during the deposition of the moisture barrier material. Specific process parameters are readily determined by experimentation.

Layer 12 of a hydrophilic, photosensitive material is formed on at least a portion of the substrate (or subbing layer 11) by processes well-known in the art and thus such processes do not form a part of this invention; see, e.g., Vol. 12, Applied Optics, pp. 232–242 (1973) and Vol. 8, Applied Optics, pp. 2346–2348 (1969).

The hydrophilic, photosensitive layer may comprise emulsions which utilize hydrophilic organic colloids as an emulsion vehicle such as dichromated gelatin, photographic silver halide emulsion, diazo gelatin and other gelatin-based photosensitive materials. The thickness of the the photosensitive layer ranges from about 1 to 100 $\mu$m, as is well-known. Generally, the thicker the layer, the more efficient in diffracting light. On the other hand, the thinner the layer, the larger the viewable angle and the larger the spectral bandwidth. Photosensitive layers for conventional holograms typically range from about 6 to 20 μm, as is well-known.

To fabricate a hologram, the pre-holographic element is further processed by exposing the photosensitive layer, either directly or through the substrate 10, to an actinic interference pattern to record a latent image thereon. The interference pattern may be generated by a picture, one or more lenses, or other suitable sources employing techniques known in the art. The photosensitive layer is then developed by methods known in the art to obtain the recorded latent image. In the case of a photosensitive layer comprising dichromated gelatin, washing with water and dehydrating with alcohol is used to develop the photosensitive layer (i.e., amplify the latent image).

In accordance with the invention, a protective layer 13 is then formed on at least a portion of the developed photosensitive layer 12. In the preferred embodiment, this protective layer covers the edges of the photosensitive layer (not shown). The protective layer includes at least two layers, a moisture barrier layer 13b, such as described above, and a hard, abrasion-resistant layer 13c. In some cases, these layers may comprise the same material. Optionally, a smoothing layer 13a may be employed prior to forming the protective layer on the photosensitive layer. For example, if a gelatin-based material is employed as the photosensitive layer, the inherent porosity of the gelatin may require a sub-layer prior to forming the moisture barrier layer. A coating 13a of parylene about 2 to 20 μm thick is suitable for this purpose. Other transparent materials, whether polymeric, glassy or polycrystalline, may also be employed, so long as they can be deposited as a smooth layer onto the photosensitive surface without degrading the image. In the case of dichromated gelatin, the upper temperature limit for application is about 150° C.

Layer 13b is a moisture barrier layer, such as described above, preferably $Si_3N_4$ about 0.2 to 0.5 μm thick formed by plasma-enhanced deposition.

Layer 13c is a hard, abrasion-resistant layer. Examples of suitable materials include $Si_3N_4$, $SiO_2$, $SiO$ and $Ta_2O_5$. Layer 13c is optional, if layer 13b comprises $Si_3N_4$, since $Si_3N_4$ forms a very hard, abrasion-resistant layer. In the case of employing $Si_3N_4$ for layer 13b, layer 13c may optionally include a layer of $SiO_2$, about 0.1 to 0.2 μm thick, or other glassy or polycrystalline material having the requisite transparency and a deposition temperature less than the softening point of the substrate. Such optional layer could be used to decrease surface reflections, since $Si_3N_4$ has a high index of refraction.

Layer 13c may also include an anti-reflection coating (not shown), such as magnesium fluoride. The thickness of an anti-reflection coating ranges from about 0.1 to 0.25 μm, as dictated by conventional calculations for thickness based on relative refractive indices.

The protective layer of the invention covers at least all the exposed photosensitive layers, including the edge (not shown), and may also cover the exposed plastic substrate surface 14. Alternatively, moisture barrier protection may be provided to surface 14 with layer 15, which may include one or more layers of the moisture barrier materials mentioned above. For example, a layer 15a of $SiO_2$, a layer 15b of $Si_3N_4$ and a layer 15c of $SiO_2$, having the thickness ranges previously described may advantageously be employed. Such additional protection, however, is not necessary if a glass substrate is employed in place of a plastic substrate 10.

The problem of ghost images exists in situations in which a relatively thick protective cover overlies a desired viewing surface. The viewer thus perceives two images, one reflected from the viewing surface, here, the hologram, and the other generated at the air/protective layer interface. The efficiency of the ghost image reflection is about 4% of incident light. It can be reduced to about 0.5% with multi-layer coatings, as is well-known, but cannot be completely eliminated with these coatings.

The linear displacement of the ghost image from the true image is a function of the optical geometry and depends on the thickness of the protective cover. As this thickness is reduced, the true image and ghost image coalesce, and, in the limiting case of a very thin protective cover, coincide. With the formation of protective layers about a few micrometers thick in accordance with the invention, the true and ghost images are virtually indistinguishable.

EXAMPLES

Figure 2:
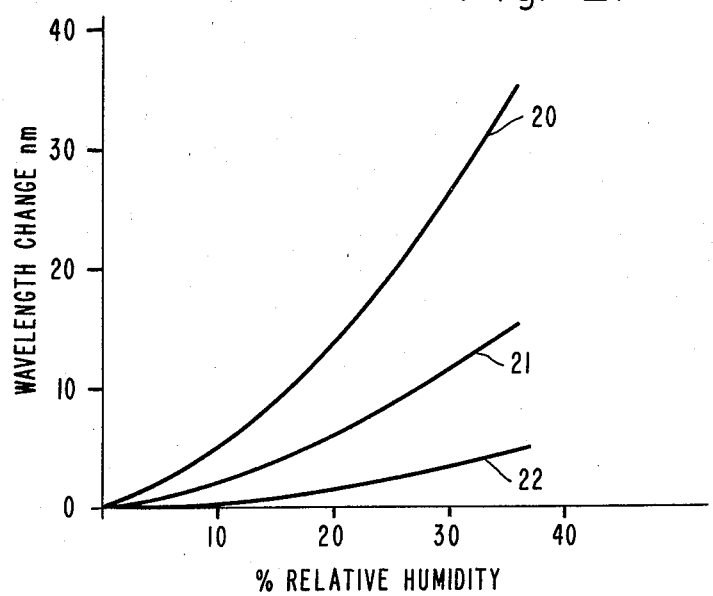
FIG. 2, on coordinates of wavelength change and relative humidity, depicts the response of reflected light wavelength from dichromated gelatin holograms with and without protective covers.

FIG. 2 shows the response of reflected light wavelength from dichromated gelatin holograms, with (Curves 21, 22) and without (Curve 20) a protective cover 13 of the invention, as a function of relative humidity. Reflected light wavelength refers to the peak reflective wavelength for a Lipmann grating. The wavelength is determined by the spacing of the interference fringes that are recorded in the photosensitive material during holographic exposure. As water enters a dichromated gelatin Lipmann grating, it is readily absorbed by the gelatin, causing it to change thickness. The thickness change, in turn, changes the interference fringe spacing. This causes a shift in the reflective wavelength. If the wavelength shift is large enough, it will cause a spectral mismatch between the light source used to illuminate the hologram and the wavelength being reflected by the hologram. This is especially critical in applications where the spectral bandwidth of the source is very narrow, such as in the P-43 phosphor 5430 Å line, where the bandwidth is only about 40 Å wide.

Measurements were conducted on dichromated gelatin Lipmann gratings in which the photosensitive layer was coated on a glass substrate, exposed and processed, employing well-known prior art procedures. Upon removal from the last processing bath, two holographic gratings were dried and coated with silicon nitride films 13 by plasma-enhanced deposition; one was not so coated (Curve 20). The thickness of one silicon nitride protective coating was 0.4 μm (Curve 21); the second, 0.8 μm (Curve 22). As is clear from FIG. 2, increasing the thickness of the silicon nitride protective coating increased the resistance of the dichromated gelatin Lipmann grating to spectral wavelength shift, particularly at the high humidity range. A shift of 1 nm in wavelength represents about $4 \times 10^{-6}$ g of moisture diffusion into the gelatin film.

What is claimed is:

1. In a process for fabricating a hologram which comprises:

(a) forming a layer of a hydrophilic, photosensitive material on at least a portion of a substrate;

(b) exposing the photosensitive layer to an actinic interference pattern to record a latent image thereon;

(c) developing the photosensitive layer to obtain the recorded latent image; and (d) forming a protective layer on at least a portion of the photosensitive layer, the improvement which comprises depositing on the layer of photosensitive material a protective cover layer including:
  (a) a moisture barrier layer less than about 5 μm thick which provides a barrier against diffusion of water vapor such that over the lifetime of the hologram, no more than about $2 \times 10^{-6}$ g $H_2O/cm^2$ is transmitted therethrough; and
  (b) a hard, abrasion-resistant layer.

2. The process of claim 1 in which the substrate consists essentially of a glass.

3. The process of claim 1 in which the substrate consists essentially of an optically transparent hydrophobic plastic.

4. The process of claim 3 in which prior to forming the layer of photosensitive material on the substrate, a layer of an optically transparent, polar, moisture barrier material is formed on at least a portion of the plastic substrate by a process which generates a temperature at the substrate of less than that of its softening point at which it deforms.

5. The process of claim 4 in which the hydrophobic substrate includes a plastic material selected from the group consisting of cellulose-acetate, polystyrene, polyester, poly-(methyl methacrylate) and polycarbonate.

6. The process of claim 4 in which the moisture barrier material comprises a material selected from the group consisting of silicon nitride, silicon oxynitride, silica, borate glasses, borosilicate glasses and glasses having a high coefficient of expansion of about $10^{-5}/°C$.

7. The process of claim 1 in which the photosensitive material is gelatin-based.

8. The process of claim 7 in which the photosensitive material comprises an emulsion selected from the group consisting of dichromated gelatin, photographic silver halide emulsion and diazo gelatin.

9. The process of claim 7 in which a layer providing a smoothing surface is formed on the layer of photosensitive material prior to forming the protective cover layer thereon.

10. The process of claim 9 in which the smoothing surface layer consists essentially of parylene.

11. The process of claim 1 in which the moisture barrier layer comprising the protective cover layer consists essentially of at least one member selected from the group consisting of $SiO_2$ and $Si_3N_4$.

12. The process of claim 1 in which the moisture barrier layer comprising the protective cover layer and the abrasion-resistant layer are one and the same.

13. The process of claim 12 in which the abrasion-resistant layer consists essentially of $Si_3N_4$.

14. The process of claim 13 in which the thickness of the $Si_3N_4$ ranges from about 0.2 to 0.5 μm.

15. The process of claim 13 in which a layer of $SiO_2$ is about 0.1 to 0.2 μm thick is deposited over the $Si_3N_4$ layer.

16. The process of claim 1 in which the abrasion-resistant layer also includes an anti-reflection coating.

* * * * *